United States Patent [19]
Dabral et al.

[11] Patent Number: 5,953,521
[45] Date of Patent: Sep. 14, 1999

[54] DATA-PATTERN INDUCED SKEW REDUCER

[75] Inventors: Sanjay Dabral, Milipitas; Dilip K. Sampath, Sunnyvale, both of Calif.

[73] Assignee: Intel Corporation, Santa Clara, Calif.

[21] Appl. No.: 08/962,812

[22] Filed: Nov. 3, 1997

[51] Int. Cl.$^6$ .................................................. G06F 13/38
[52] U.S. Cl. ............................................ 395/552; 395/880
[58] Field of Search .................................... 395/551, 552, 395/558, 878–881; 371/1

[56] References Cited

U.S. PATENT DOCUMENTS

| | | | |
|---|---|---|---|
| 5,101,347 | 3/1992 | Balakrishnan et al. | 395/286 |
| 5,426,772 | 6/1995 | Brady | 395/558 |
| 5,502,819 | 3/1996 | Aldrich et al. | 395/553 |

*Primary Examiner*—Thomas M. Heckler
*Attorney, Agent, or Firm*—Arnold, White & Durkee

[57] ABSTRACT

The amount of skew present in a signal delivered over a transmission line is reduced by identifying of the type of data pattern from which a bit of data is being sent and generating a corresponding delay in response to identification of the data pattern is described. The generated delay results in reducing the amount of skew present in the system. In a first configuration, the invention includes first-storage and second-storage mechanisms, a logic gate, first and second delay paths, and a mechanisms for generating an output terminal. The first-storage mechanism stores a first digital signal. The second-storage mechanism stores a second digital signal that occurs in a selected number of clock transitions after the first data signal. The two storage mechanisms are connected to a logic gate. The first storage mechanism is also connected to the first and second delay paths which delay signals sent to them. A generating mechanism is connected to the delay paths and the logic gate and generates an output terminal signal in response to the selection of a digital signal from either the first or second delay path. A second configuration includes bypass circuitry coupled to the generating mechanism and the logic device.

26 Claims, 8 Drawing Sheets

DATA-PATTERN INDUCED SKEW REDUCER

BACKGROUND OF THE INVENTION

1. Field of the Invention

The invention relates in general to the field of computing and, more particularly, to buses used in computing. Specifically, the invention relates to enhancing the bus transfer rates by reducing data-pattern-induced skew caused by intersymbol interference.

2. Description of the Related Art

Modem computer systems may contain several microprocessors, microcontrollers, and other digital devices connected to each other by a bus. The bus transports data among the microprocessors and other components. The bus is composed of a number of traces. Traces are wire-like connections that are printed on the circuit board and function as transmission lines.

FIG. 1 illustrates a conventional latched driver configuration with a latch 105 and a driver circuit 100 coupled to a transmission line 110. Data that appears at an input terminal 106 to the latch 105 can be placed at an output terminal 107 of the latch 105 after the clock signal has transitioned (i.e., changed states); a positive or negative edge of the clock signal can be used consistently for this purpose. When the data appears at the output terminal 107 of the latch 105 and the driver circuit 100 is enabled, the data is ready to be propagated, allowing a data signal to be transferred to the transmission line 110. If there is a large impedance mismatch between the transmission line 110 and the driver circuit 100, intersymbol interference can occur. The presence of intersymbol interference on a transmission line can cause an increase in the skew and a corresponding decrease in the overall bus transfer rate. Thus, it would be beneficial to have a device that can enhance bus transfer rate by minimizing intersymbol interference.

SUMMARY OF THE INVENTION

In one aspect of the present invention, a skew reducer to minimize the uncertainty of the data window at the receiver caused by intersymbol interference is provided. The skew reducer includes a memory with a data input terminal and an output terminal, and is adapted to receive and record the immediate history of the data stream driven out from the core. A logic circuit has an input terminal coupled to receive at least a portion of the bits in the memory, and an output terminal coupled to deliver a first signal in response to the digital signal having a first predetermined pattern, and deliver a second signal in response to said digital signal having a second predetermined pattern. A first delay path is coupled to receive the digital signal. A multiplexer has a first input terminal coupled to the first delay path, a second input terminal coupled to receive the digital signal, and an enable coupled to the output terminal of the logic circuit.

In another aspect of the present invention, a method is provided for reducing skew. The method includes: storing a digital signal; providing a first signal in response to said digital signal having a first predetermined pattern and providing a second signal in response to said digital signal having a second predetermined pattern; delaying the digital signal for a first predetermined period of time to produce a first version of the digital signal after the first predetermined delay; selecting the first version of the digital signal in response to storing the first signal; and selecting the digital signal in response to storing the second signal.

BRIEF DESCRIPTION OF THE DRAWINGS

Other objects and advantages of the invention will become apparent upon reading the following detailed description and upon reference to the drawings in which.

Figure 1:
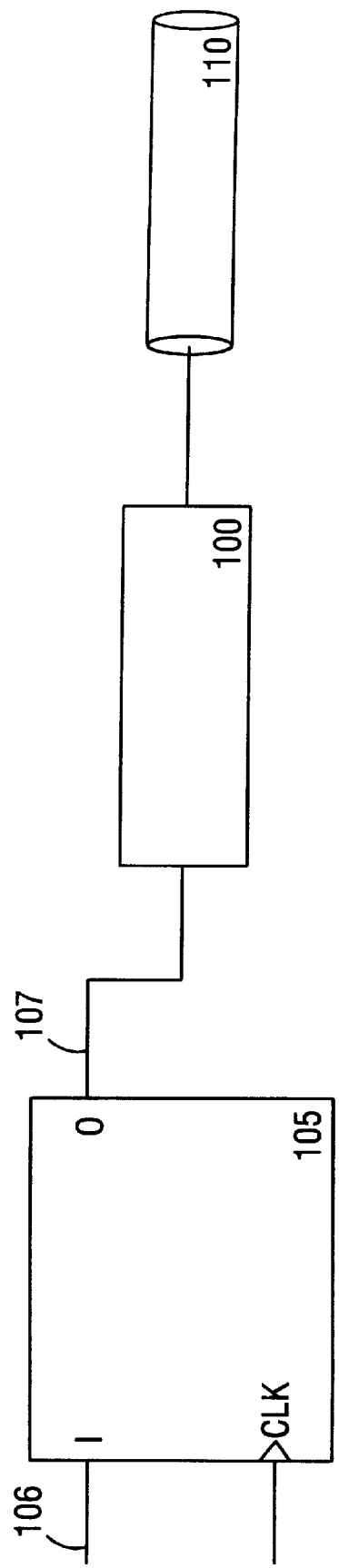
FIG. 1 is a block representation of a conventional bus driving system.

While the invention is susceptible to various modifications and alternative forms, specific embodiments have been shown by way of example in the drawings and are described in detail. It should be understood, however, that the description herein of specific embodiments is not intended to limit the invention to the particular forms disclosed; on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below as they might be employed in a data-pattern induced skew reducer. In the interest of conciseness, not all features of an actual implementation are described in this specification. It will of course be appreciated that in the development of any actual embodiment, numerous implementation-specific decisions must be made to achieve the developer's specific goals, such as compliance with system-related and business-related constraints. Moreover, it will be appreciated that even if such a development effort might be complex and time-consuming, it would nevertheless be a routine undertaking for one of ordinary skill having the benefit of this disclosure.

Overview

As previously mentioned, modem computer systems generally contain numerous components (e.g., a microprocessor, disc drive, monitor, keyboard, CD drive, etc.) that communicate with each other. Thus, there is normally a large number of data transfers occurring during any given time. In most modem computer systems, data is in the form of bits (i.e., binary digits). Bits are typically stored as voltages. When positive logic is used, a bit value of one (i.e., a one) is generally stored as a high voltage, while a bit value of zero (i.e., a zero) is generally stored as a low voltage. A high voltage, as defined in this application, is a voltage equal to the voltage $V_{CC}$ when used "on chip" and $V_{ddq}$ when used for the input/output circuits. A low voltage is a voltage level equal to the ground voltage.

Figure 2A:
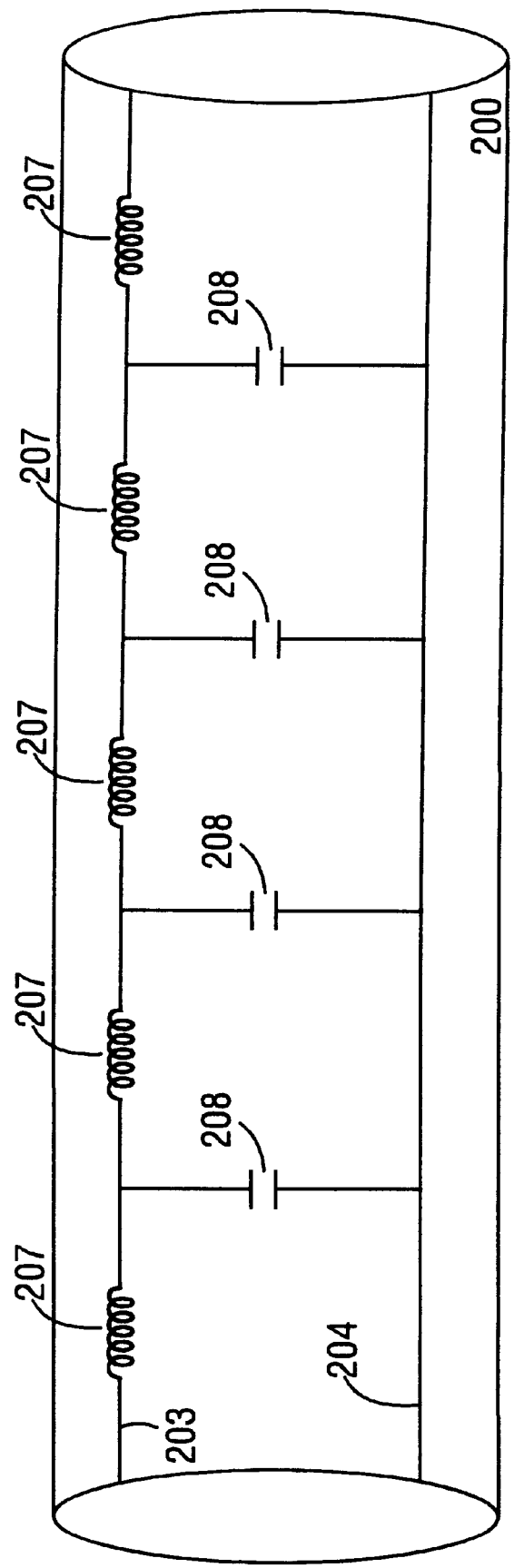
FIGS. 2A and 2B are illustrations of conventional transmission lines.

FIG. 2A is an equivalent circuit representation of a transmission line 200, which can be used to send information from one location to the other. Generally, current is sent from one location along a top rail 203 to a second location, and return current is sent back to the first location along a bottom rail 204. Associated with both rails 203, 204 are several inductors 207 and capacitors 208 which constitute an ideal transmission line having impedance $Z_0$. As the current continues to progress down the transmission line 200, data is continually stored on corresponding capacitors 208. In this manner, data can be sent from one location to the other.

Figure 2B:
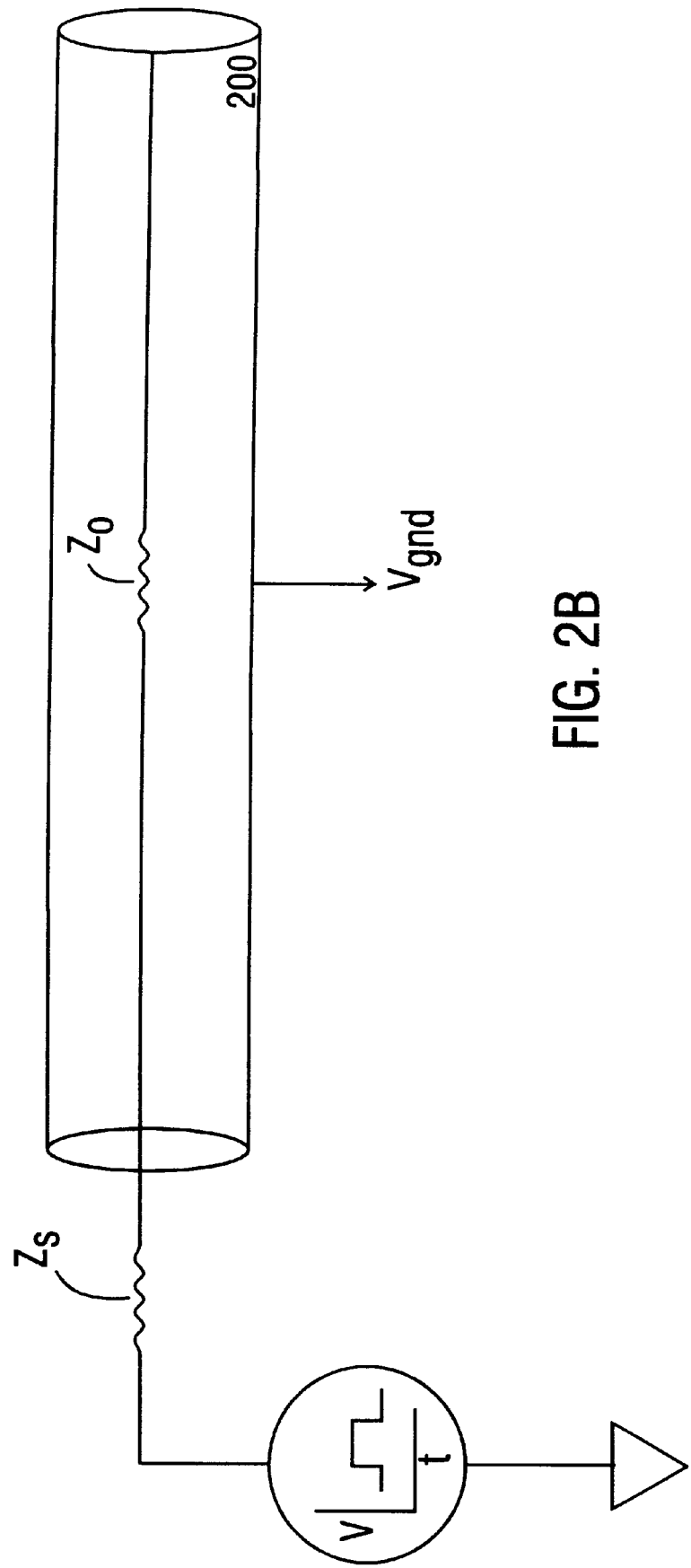

FIG. 2B illustrates the transmission line 200 with an impedance $Z_0$ connected to a voltage source (not shown)

that generates a data-dependent voltage level $V_S$ with an associated source impedance $Z_S$. The voltage $V_S$ is applied to the transmission line 200, causing current to flow from the voltage source (not shown) along the transmission line 200. In the ideal case where the source impedance $Z_s$ is equal to the transmission line impedance $Z_0$, current would only flow for one round trip (i.e., down the transmission line and back). After one complete round trip, all the current and voltage requirements are met. Consequently, the transmission line settles to the driven state (i.e., the state determined by the transmitting logic) and is referred to as a perfectly driven line. Settling, as defined in this application, refers to the state in which essentially no remnants of reflected currents and voltages are present on the transmission line.

Figure 3:
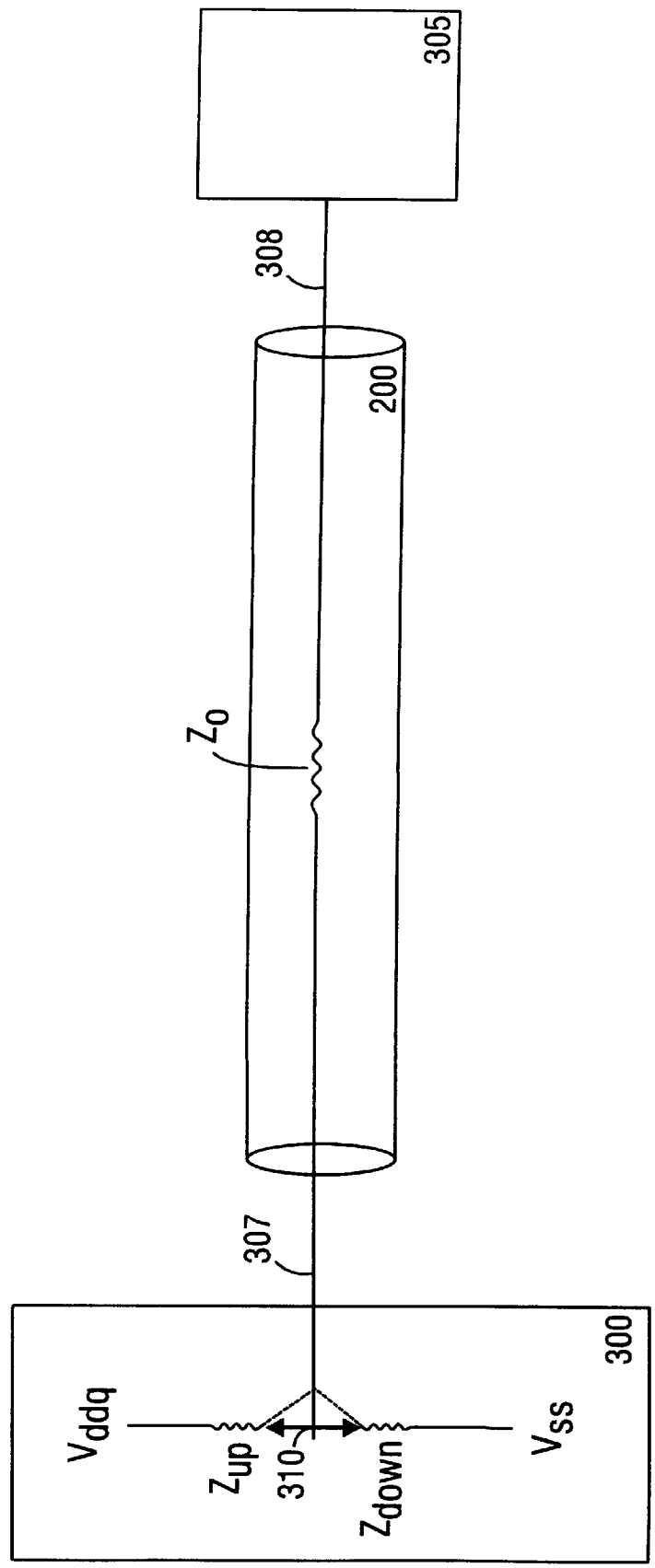
FIG. 3 is a symbolic representation of a transmission line in a computer system.

Within a computer system, a conventional driver (i.e., a transmitter) 300 and a receiver 305 are generally used to drive and sense data on the transmission line 200, as shown in FIG. 3. The impedance of the transmission line 200 is represented by $Z_0$, as previously mentioned. The transmission line 200 is connected to the driver 300 along a line 307 and to the receiver 305 along a line 308. Typically, drivers transfer digital signals on a transmission line 200 by connecting the transmission line 200 to a voltage source. Digital signal, as defined in this applications, refers to either a data signal, clock signal, or a strobe signal. The voltage source may generate the voltage $V_{ddq}$ which may be different from the voltage $V_{CC}$, while the voltage $V_{SS}$ may be a ground voltage. The driver 300 can be modeled simplistically as an impedance $Z_{up}$ associated with a voltage $V_{ddq}$ and an impedance $Z_{down}$ associated with a voltage $V_{SS}$. A switch 310 can be used to connect the line 307 to either the voltage source 302 or the voltage source 303. The switch 310 may be controlled by an enable signal (not shown). If the enable is "on", the buffer is active otherwise the driver is in a high impedance state.

If the driver 300 previously sent a "low" and is about to send a "high" along a perfectly driven line, the impedances $Z_{up}$ and $Z_0$ would impact the currents progressing down the lines; in this case, $Z_{up}$ is equal to $Z_0$. Thus, the driver 300 applies a voltage $V_{ddq}$ which appears as ½ $V_{ddq}$ on the transmission line 200. The current flows from the driver 300 to the receiver 305. The reflected current has an associated voltage of $V_{ddq}$ which has been doubled from ½ $V_{ddq}$ and propagates towards the driver 300. Since the driver is generating a voltage $V_{ddq}$ and the reflected voltage is $V_{ddq}$, no additional currents are generated. Thus, the transmission line is a perfectly driven line and settles in one round trip. One skilled in the art would appreciate that the transmission line 200 could also be perfectly driven if the impedance $Z_{down}$ was equal to impedance $Z_0$ and the driver was applying a "low" to the line.

If either the impedance $Z_{up}$ or $Z_{down}$ is not equal to the impedance $Z_0$ (i.e., if there is impedance mismatch) of the transmission line 200, the current which was reflected at the receiver would be reflected again at the driver 300, and the voltage on the transmission line 200 would not be equal to $V_{ddq}$. Thus, there would be multiple reflections before the transmission line settles for a non-perfectly driven transmission line. When the impedance $Z_{up}/Z_{down}$ is less than the impedance $Z_0$, the transmission line would be overdriven, while it would be underdriven if the impedance $Z_{up}/Z_{down}$ is greater than the impedance $Z_0$. One skilled in the art will appreciate that variations in processing factors (e.g., gate length, threshold voltage, oxide thickness, etc.) voltage and temperature can impact the impedance of a transmitter. These not only affect the output impedance of the driver but also the edge rate of the driven signal.

The reflected signals present in the overdriven or underdriven state can interfere with future signals that are being sent by the driver 300, which is generally known in the art as intersymbol interference. Thus, impedance mismatching can cause intersymbol that induces uncertainty in the period that a valid signal can be received. The length of a transmission line may also affect intersymbol interference. Transmission lines with longer lengths have longer round-trip delays to which typically require a large settling time. If the time needed to settle the transmission line is larger than the bus transfer rate, a new data signal could be sent before the transmission line has settled, thus causing intersymbol interference. Other factors such as an imperfect transmission environment made of multiple transmission lines connected in series with imperfect connectors, package inductances, package stubs, capacitances, etc., also cause intersymbol interference.

Skew is generally defined in the art as the difference between the actual and expected signal edge. Skew can cause variations in the available setup and hold times at the receiver. The setup time, as defined generally in the art, is the valid data time before the active transition of a clock in which the input terminal has to be maintained at a valid level. An active clock transition, as defined at the receiver, is a clock transition in which data is to be captured at the receiver. In the art, the hold time is generally defined as the valid data time after an active clock transition in which the input terminal has to be maintained at a valid level. Skew generally represents a loss in performance in relation to data sampling at the receiver, thus affecting the bus transfer rate.

Data transfer generally involves the transfer of a combination of "ones" and "zeroes". The combination of "ones" and "zeroes" transferred to a single transmission line is referred to as a data pattern. Typically, there are two types of data patterns. A high frequency data pattern generally oscillates (i.e., the voltage level toggles between two values) every clock cycle. For example, a data pattern such as 1-0-1-0-1-0 is a high frequency data pattern assuming that the signals are generated at each clock transition. The voltage level of that pattern toggles between high and low every clock transition. In contrast, a low frequency data pattern is generally defined as a data pattern that does not transition every clock (e.g., 1-1-0-0-1-1-0-0).

The present invention identifies the above-mentioned data pattern that is to be sent along a transmission line. Predetermined delays are then added to the data signal based on the history of the data pattern, which helps to minimize intersymbol interference. As previously mentioned, when intersymbol interference is minimized, skew is reduced, which enhances the bus transfer rate and correspondingly increases the system processing speed.

Specific Embodiments

Figure 4A:
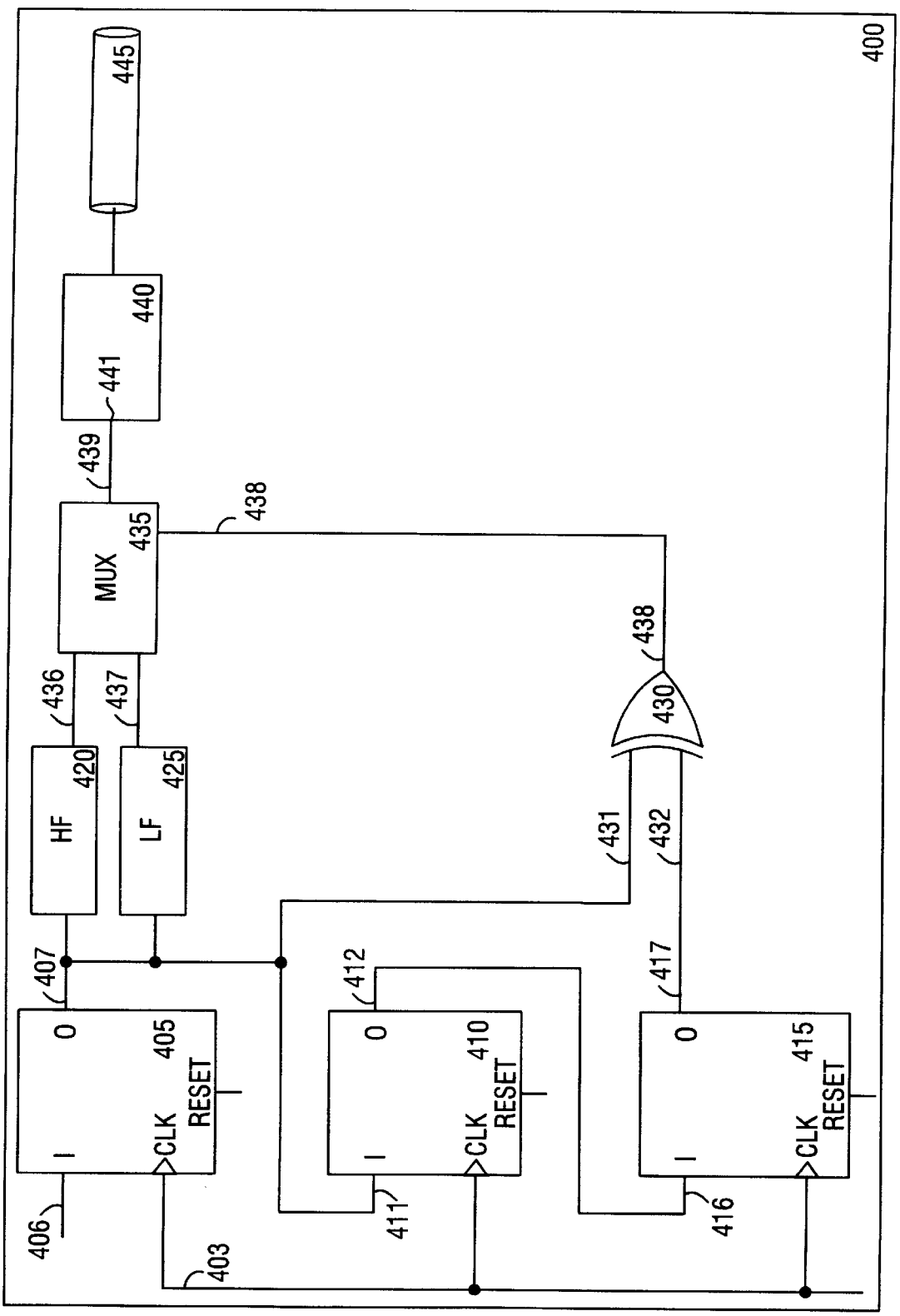
FIG. 4A illustrates a first embodiment of a skew reducer constructed in accordance with the invention.

FIG. 4A illustrates a first embodiment of a skew reducer 400 in accordance with the invention. The skew reducer 400 includes three storage elements (e.g., latches, flip-flops, etc.) 405, 410, and 415, which all have an enable input terminal CLK coupled to a clock signal line 403 and a reset input terminal RESET which may be user controlled, and the input terminals of the latches would reflect this state. Thus, the latches 405, 410, and 415 pass the data from their respective input terminals 406, 411, 416, to their respective output terminals 407, 412, 417 when a clock transition occurs. The output terminal 407 of the latch 405 is connected to the input terminal 411 of the latch 410. Similarly, the output terminal 412 of the latch 410 is connected to the input terminal 416 of the latch 415.

High and low frequency delay paths 420 and 425 are coupled to the output terminal 407 of the latch 405. The high frequency delay path 420 is a delay path used for data signals that have a high-frequency data pattern. Similarly, the low frequency delay path 425 is a delay path used with data signals that have a low-frequency data pattern. Thus, the signal at the output terminal 407 of the latch 405 is applied to the high-frequency delay path 420, the low frequency delay path 425, and the input terminal 411 of the latch 410. The delay paths 420 and 425 are also connected to the input terminals 436 and 437 of a multiplexer 435. The high and low frequency delay paths 420 and 425 may include several logic devices (e.g., inverters), compensated delay lines, or may be just a wire delay, depending on design interests. One skilled in the art will appreciate that the delay paths 420, 425 as shown in FIG. 4A, are functionally equivalent.

The data signal at the output terminal 407 of the latch 405 is also applied to one input terminal 431 of an exclusive OR (EX-OR) logic gate 430. The input terminal 431 of the EX-OR gate may also be connected to the input terminal 406 of the latch 405 as shown in FIG. 4E. Alternatively, the EX-OR logic gate 430 could be replaced by a combination of logic devices whose function is essentially the same. The output terminal 417 of the latch 415 is applied to a second input terminal 432 of the EX-OR logic gate 430. The output terminal of the EX-OR logic gate 430 is connected to a select input terminal 438 of the multiplexer 435. Finally, an output terminal 439 of the multiplexer 435 is connected to an input terminal 441 of a driver circuit 440, which is connected to a transmission line 445. The select input terminal 438 of the multiplexer 435 allows either the signal from the high frequency delay path 420 or the low frequency delay path 425 to be transferred to the transmission line 445 by the driver circuit 440.

If a three bit data stream (e.g., 1-0-1) were present at the input terminal 406 to the latch 405, each bit would individually be recorded in the skew reducer. When the clock transitions, the first data bit (i.e., the first one) would be transferred to the output terminal 407. The first data bit is applied to the high and low frequency delay paths 420, 425, the input terminal 411 of the latch 410, and the input terminal 431 of the EX-OR logic gate 430.

As an example, the high-frequency delay path 420 may include six inverters (not shown), the delayed first bit value appears at the input terminal 436 of the multiplexer 435 after a time delay $t_{HF}$ related to the time that it takes to traverse six inverters. For example, the first data bit may go from a high to a low after passing the through the first inverter in the high frequency delay path 420 in a time $\frac{1}{6} t_{HF}$. Alternatively, a "low" to "high" transition can also be implemented. Similarly, the same data bit would become a high again after traversing a second inverter after some time delay $t_{HF}/3$. After traversing all six inverters, the first data bit would be in a high state and would be at the input terminal 436 of the multiplexer 435 after some delay $t_{HF}$. A circuit may also be designed such that the low-to-high and high-to-low delays are different. Similarly, the high-frequency and low-frequency delays may be different where, for example, one delay may be zero and the other a select amount.

The value of the delay $t_{HF}$ would depend upon the time delay associated with each of the six inverters. The time delay of an inverter is essentially the time that it takes for a change at the input terminal to be seen at the output terminal. One skilled in the art will appreciate that the low-frequency delay path 425 would function essentially the same as the high frequency delay path 420, but would have a different delay $t_{LF}$ as compared to the high-frequency, delay path 420. As previously mentioned, either passive devices (e.g., interconnects) or active logic devices (e.g., inverters) can be used to form either delay path 420 or delay path 425. If the low-frequency, delay path 425 only contains an interconnect (i.e., a wire), the delay associated with the first data bit becomes $t_{LF}$ which is equivalent to the time it takes to propagate through the wire. After a time $t_{LF}$, the delayed first data bit appears at the input terminal 437 to the multiplexer 435.

Figure 4B:
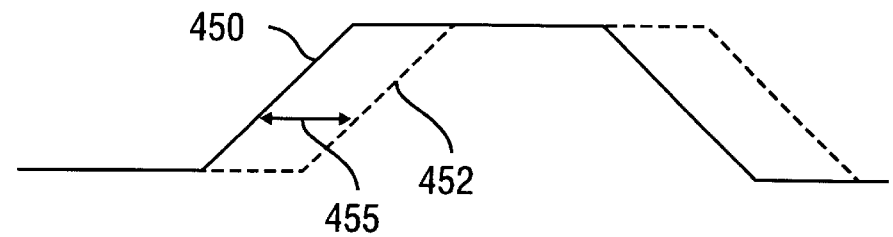
FIG. 4B–4D are timing diagrams for a skew reducer in accordance with the invention.
Figure 4C:
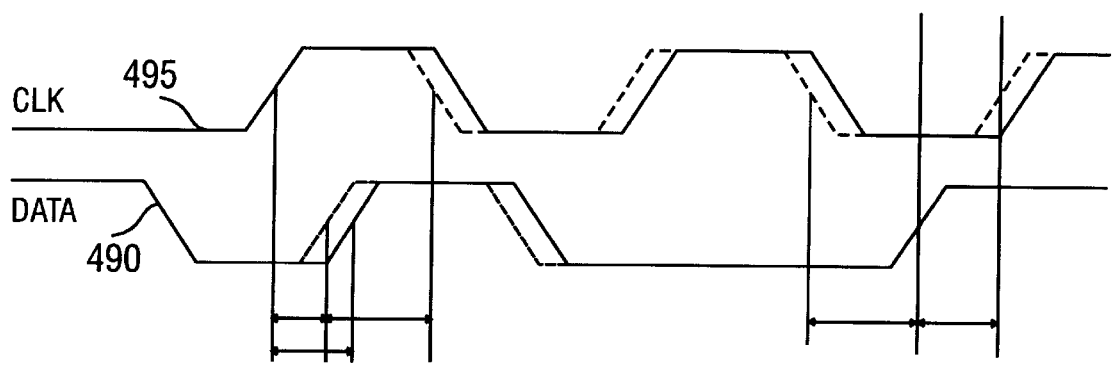
Figure 4D:
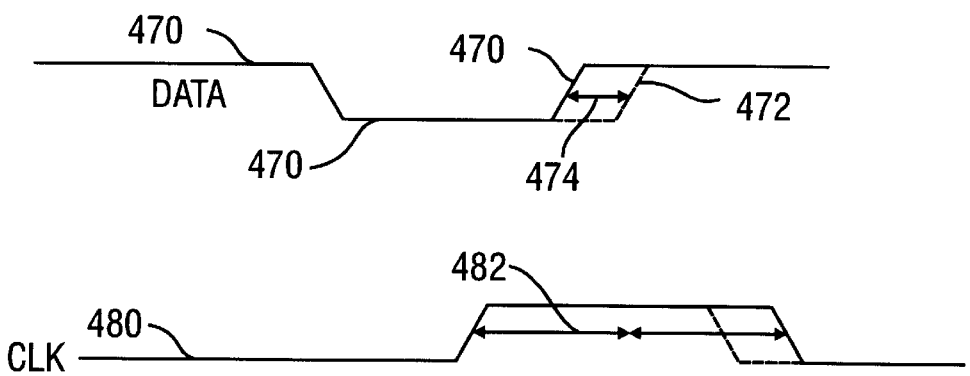
Figure 4E:
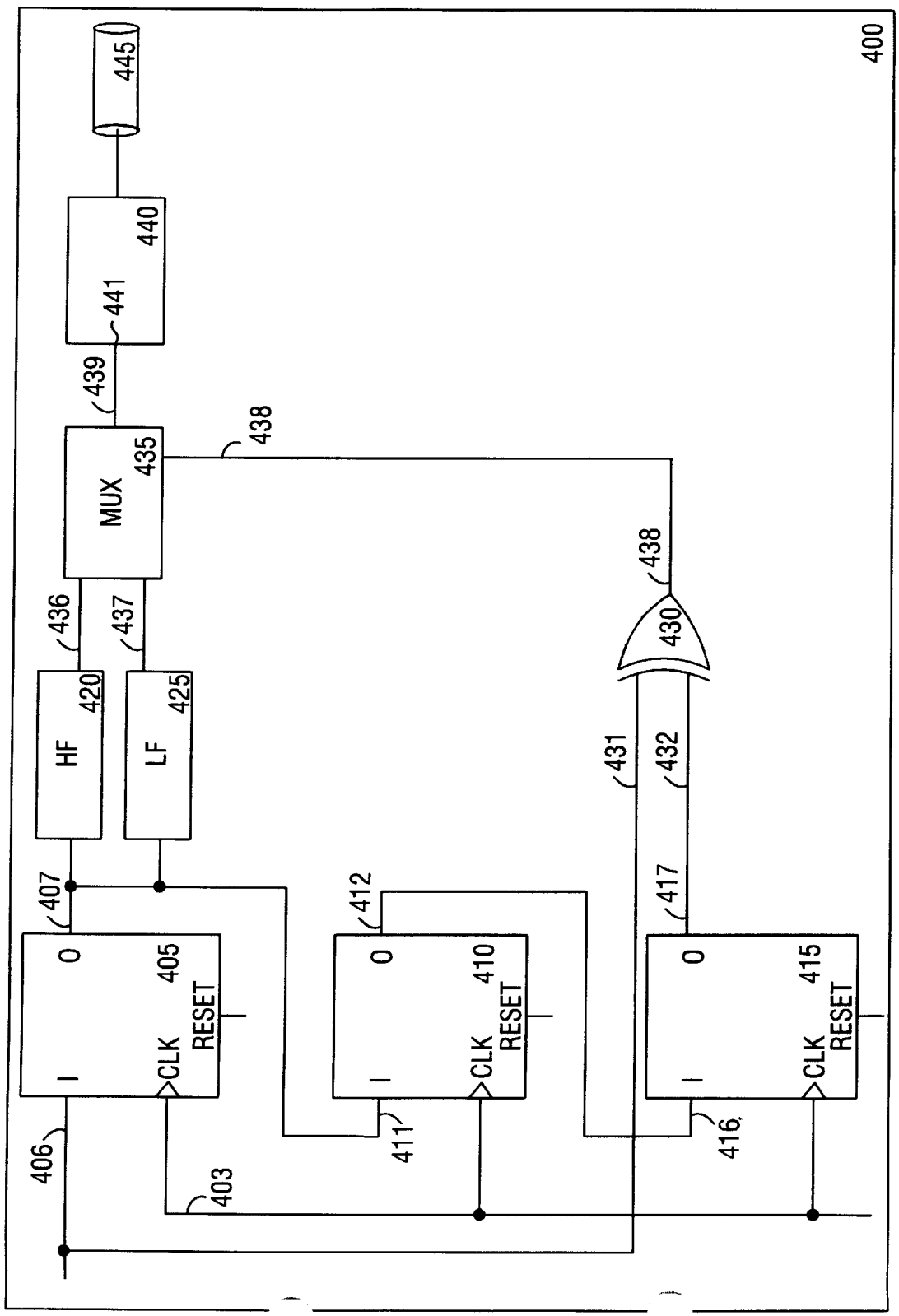
FIG. 4E is an alternative embodiment for a skew reducer in accordance with the invention.

FIGS. 4B–4D are timing diagrams that illustrate FIG. 4B is a timing diagram illustrating the difference between the input data signal in the delay path to the output data signal from the delay path. The data signal 450 is the data signal at the input to the high-frequency, delay path 420. The signal 452 corresponds to the signal at the output of the high-frequency path 420. The timing difference 455 between the two signal corresponds to the delay $t_{HF}$. One skilled in the art will appreciate that the data signals 450, 452 will vary as different signals are applied to the input of the delay paths.

A second clock transition places the second data bit (i.e., the zero in this example) which was at the input terminal 406 of the latch 405 at the output terminal 407 of the latch 405. This data bit is also applied to the input terminals of the high and low frequency delay paths 420, 425 and the input terminal 431 of the EX-OR logic gate 430. The time required for progression of the second bit through the high and low frequency delay paths 420, 425 is the same as it was for the first bit. Almost simultaneously, the first data bit which was at the input terminal 411 of the latch 410 is transferred to the output terminal 412. The first data bit is then applied to the input 416 of the latch 415.

Finally, a third clock transition places the first data bit which was at the input terminal 416 of the latch 415 at the output terminal 417; the second data bit which was at the input 411 is placed at the output 412 of the latch 410. The third data bit which was at the input 406 is placed at the output 407 of the latch 405, the inputs of the high and low frequency delay paths, and the input 431 of the EX-OR logic gate 430. Thus after three clock transitions, the outputs of the latches 415, 410, 405 corresponding to the first, second, and third bits of the original data stream are 1-0-1, respectively illustrating the recording nature of the skew reducer 400.

The EX-OR logic gate 430 generates an output on the line 438 after comparing the third data bit (i.e., the one at the output terminal 407) to the first data bit (i.e., the one at the output terminal 417). In this example, the first and third bits are the same (i.e., both are high), which generates a low on the output terminal 438 of the EX-OR gate 430. The low at the output corresponds to the select input 438 of the multiplexer 435. The multiplexer would then allow the passage of the delayed high frequency signal from the high frequency delay path 420 through the multiplexer 435 to the driver circuit 440.

As would be understood by one skilled in the art, identical first and third bits do not always indicate the data pattern is a high frequency data pattern. For example, an extremely low-frequency data pattern (e.g., 1-1-1-1 and 0-0-0-0) have the same first and third bits but are not a high-frequency data pattern. In this case, the multiplexer 435 would still select the data signal from the high-frequency, delay path to be sent to the driver circuit 440. Though the wrong delay would have occurred, the signal would not cause difficulty at the receiver because the bus would not be transitioning is already in a settled state.

If the first and third bits are different, the EX-OR logic gate 430 causes the multiplexer 435 to pass the delayed signal from the low frequency delay path 425 to the driver circuit 440. The values used for the high frequency and low frequency delays can be generated from simulation of an actual computer system. For example, the measurements of specific components in a given circuit can be placed in a simulation program, and the high frequency and low frequency delays needed to minimize skew could be generated.

The placement of delayed signals on the transmission line by the driver results in an increase valid data time. The valid data time is the sum of the setup and hold times. FIG. 4D is a timing diagram illustrating the data signal that was sent by the driver which is now at the receiver. One is skilled in the art will realize that the signals 470, 480 shown in FIG. 4D are an exploded view of a portion of the signals 490, 495 of FIG. 4C. The data signal 472 indicates the expected data signal, while the second data signal 470 is the actual observed signal and the region labeled 474 is the time difference between the two signals 470, 472. The valid data time 482 is considerably larger than the corresponding time for a conventional logic circuit without a skew reducer. In this example, the high frequency delay path should be delayed by a time $t_{HF}$ indicated by the region 474 in order to restore the signal back to its expected timing.

Figure 5:
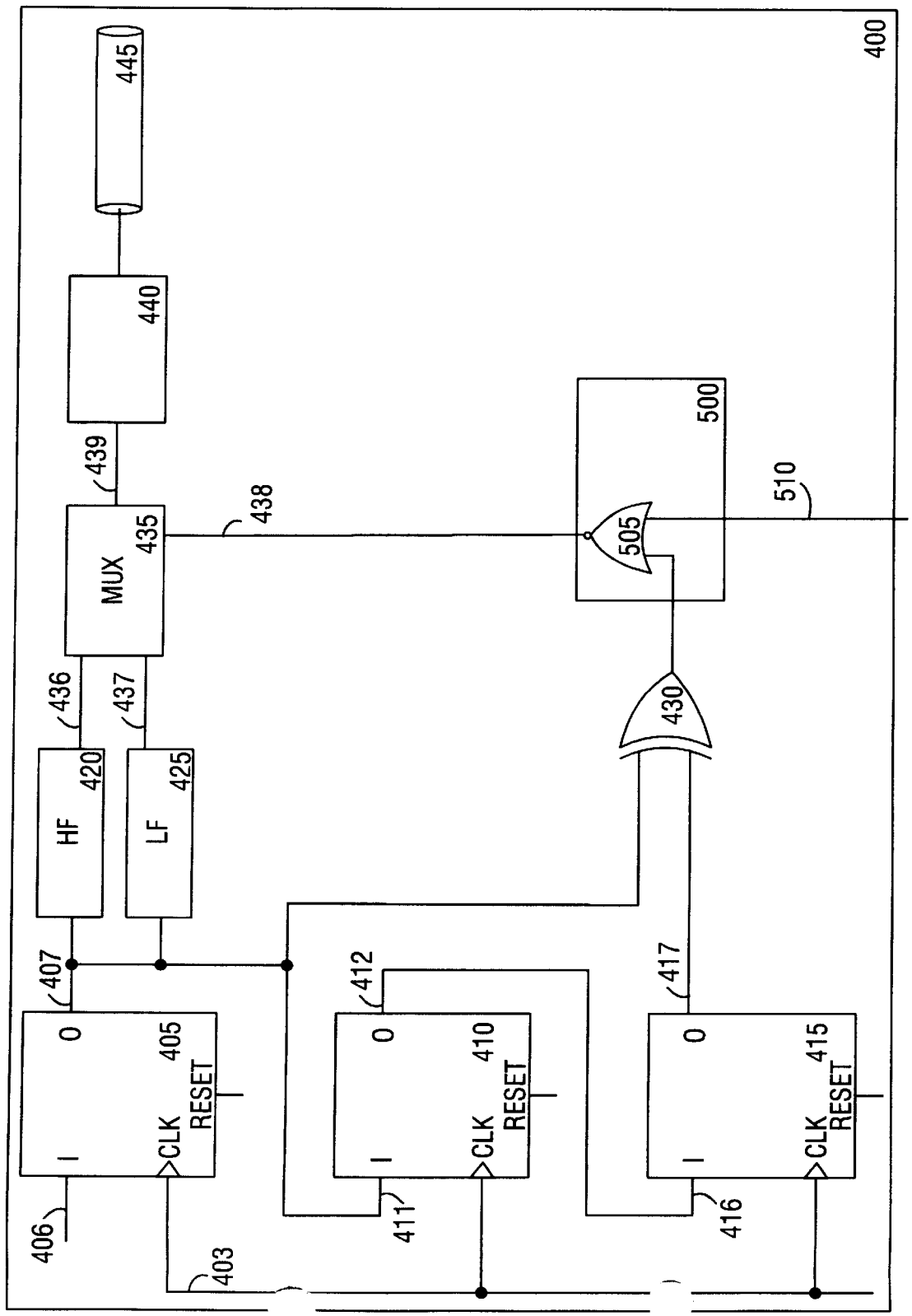
FIG. 5 illustrates a second embodiment of a skew reducer constructed in accordance with the invention.

In some implementations, the user may choose to disable the skew reducer 400. Override circuitry 500 is provided to temporarily bypass the skew reducer 400, as shown in FIG. 5. Within the override circuitry 500 is a NOR gate 505. One skilled in the art will appreciate that other types of logic gates that are functionally equivalent to the NOR gate 500 could be used. An enable signal is sent to the override circuitry 500 along a line 510. By placing a high signal on the line 510, the output terminal of the NOR gate 505 is forced low, independent of the status of the output terminal of the EX-OR gate 430. A low signal at the output terminal of the NOR gate 505 forces the multiplexer 435 to select the data signal from the low-frequency, delay path 425. If the low frequency delay path 425 only contains a wire, there would be essentially the same amount of delay in traversing the skew reducer 400 as it would exist in a conventional latching bus structure. Thus, data would have essentially bypass the skew reducer 400.

The skew reducer 400 provides an enhancement of processing speed by minimizing skew. Reduction of skew results in a corresponding increase in the bus transfer rate because of the decrease of intersymbol interference. Simulated results have shown an increase in the number of transfers/second of approximately twenty-one percent. The increase in the rate of transfer is partially a result of the forty percent increase in the total valid data time (i.e., the sum of both the setup and hold times). An increase in the bus transfer rate, such as the one mentioned above, can tremendously impact the overall processing capabilities of modern computer systems.

It will be appreciated by those of ordinary skill in the art having the benefit of this disclosure that numerous variations from the foregoing illustration will be possible without departing from the inventive concept described therein. Accordingly, it is the claims set forth below, and not merely the foregoing illustration, which are intended to define the exclusive rights of the invention.

What is claimed is:

1. A skew reducer, comprising:
   a first delay path coupled to receive a digital signal and deliver a first version of the digital signal after a first predetermined delay;
   means for storing the digital signal, providing a first signal in response to said digital signal having a first predetermined pattern and providing a second signal in response to said digital signal having a second predetermined pattern; and
   means for selecting the first version of the digital signal in response to receiving the first signal, and selecting the digital signal in response to receiving the second signal.

2. The skew reducer of claim 1, wherein the means for storing includes means for providing the first signal in response to said digital signal having a pattern indicative of a high frequency signal.

3. The skew reducer of claim 1 wherein the means for storing includes means for providing the second signal in response to said digital signal having a pattern indicative of a low frequency signal.

4. The skew reducer of claim 1, including means for delivering the selected signal to a transmission line.

5. The skew reducer of claim 1 wherein the first delay path comprises at least one logic device selected from the group consisting of active logic devices, compensated delay lines, and passive devices.

6. The skew reducer of claim 1 wherein the means for selecting includes means for preventing the selection of the first version of the digital signal and delivering a second version of the digital signal in response to receiving the first signal and a control signal.

7. The skew reducer of claim 1, including a second delay path coupled to receive the digital signal and deliver a second version of the digital signal after a second predetermined delay, and wherein the means for selecting the digital signal in response to receiving the second signal includes means for selecting the second version of the digital signal in response to receiving the second signal.

8. A skew reducer, comprising:
   a memory having a data input terminal and an output terminal for receiving and storing a digital signal having a plurality of bits;
   a logic circuit having an input terminal coupled to receive at least a portion of the bits in the memory, having an output terminal to deliver a first signal in response to the digital signal having a first predetermined pattern, and deliver a second signal in response to said digital signal having a second predetermined pattern;
   a first delay path coupled to receive the digital signal; and
   a multiplexer having a first input terminal coupled to the first delay path, a second input terminal coupled to receive the digital signal, and an enable coupled to the output terminal of the logic circuit.

9. The skew reducer of claim 8, wherein the logic circuit is an EX-OR logic gate.

10. The skew reducer of claim 8, including a second delay path coupled to receive the digital signal, and wherein the second input terminal of the multiplexer is coupled to the second delay path.

11. The skew reducer of claim 8, including a driver circuit having an input terminal coupled to an output terminal of the multiplexer and an output terminal coupled to a transmission line.

12. The skew reducer of claim 8, wherein the first delay path comprises a plurality of inverters.

13. The skew reducer of claim 10, wherein the memory includes a first and second latch each having a data input terminal, a clock input terminal, and a data output terminal, the data input terminal of the first latch being coupled the receive the digital signal, the data output terminal of the first latch being coupled to the data input terminal of the second latch, the clock input terminals coupled to receive a clock signal, and at least one of the data output terminals of the first and second latches being coupled to the logic circuit and the first and second delay paths.

14. The skew reducer of claim 13, wherein the memory includes a third latch having a data input terminal, a clock input terminal, and a data output terminal, the data input terminal of the third latch being coupled to the data output terminal of the second latch, the clock input terminal of the third latch being coupled to a clock signal, and the data output terminals of the first and third latches being coupled to the logic circuit.

15. The skew reducer of claim 8, including an override circuit having a first input terminal coupled to the output terminal of the logic circuit, an output terminal coupled to the enable of the multiplexer, and a second input terminal coupled to receive a control signal, said override circuit for delivering a signal in response to receiving the control signal, independent of the value of the signal received from the logic circuit.

16. A skew reducer, comprising:
   a first data storage mechanism having a data input terminal and an output terminal;
   a second data latch having an input terminal coupled to the output terminal of the first data storage mechanism and an output terminal;
   a third data latch having an input terminal coupled to the output terminal of the second data latch and an output terminal;
   an EX-OR logic gate having a first input terminal coupled to the output terminal of the first data storage mechanism, a second input terminal coupled to the output terminal of the third data latch, and an output terminal;
   a high-frequency delay buffer having an input terminal coupled to the output terminal of the first data storage mechanism and an output terminal;
   a low-frequency delay buffer having an input terminal coupled to the output terminal of the first data storage mechanism and an output terminal;
   a multiplexer having a first input terminal coupled to the output terminal of the high-frequency delay buffer, a second input terminal coupled to the output terminal of the low-frequency delay buffer, an enable coupled to the output terminal of the EX-OR logic gate, and an output terminal; and
   driver circuitry having an input terminal coupled to the output terminal of the multiplexer and an output terminal coupled to a transmission line.

17. The skew reducer of claim 16, wherein the high-frequency delay buffer comprises a plurality of inverters.

18. The skew reducer of claim 16, wherein the low-frequency delay buffer is a wire.

19. The skew reducer of claim 16, further comprising override circuitry coupled between the output terminal of the EX-OR logic gate and the input terminal of the multiplexer.

20. The skew reducer of claim 16, wherein the storage mechanism is selected from the group of storage mechanisms consisting of latches and flip-flops.

21. A method for reducing skew, comprising:
   storing a digital signal;
   providing a first signal in response to said digital signal having a first predetermined pattern and providing a second signal in response to said digital signal having a second predetermined pattern;
   delaying the digital signal for a first predetermined period of time to produce a first version of the digital signal after the first predetermined delay;
   selecting the first version of the digital signal in response to storing the first signal; and
   selecting the digital signal in response to storing the second signal.

22. The method of claim 21, wherein providing a first signal in response to said digital signal having a first predetermined pattern includes providing the first signal in response to said digital signal having a pattern indicative of a high frequency signal.

23. The method of claim 21, wherein providing a second signal in response to said digital signal having a second predetermined pattern includes providing the second signal in response to said digital signal having a pattern indicative of a low frequency signal.

24. The method of claim 21, including delivering the selected signal to a transmission line.

25. The method of claim 21, wherein selecting the first version of the digital signal in response to receiving the first signal includes preventing the selection of the first version of the digital signal and delivering a second version of the digital signal in response to the first signal and a control signal.

26. The method of claim 21, including delaying the digital signal for a second predetermined period of time to produce a second version of the digital signal after the second predetermined delay, and wherein selecting the digital signal in response to storing the second signal includes selecting the second version of the digital signal in response to receiving the second signal.

* * * * *

UNITED STATES PATENT AND TRADEMARK OFFICE
CERTIFICATE OF CORRECTION

PATENT NO. : 5,953,521
DATED : September 14, 1999
INVENTOR(S) : Dabral et al.

It is certified that error appears in the above-identified patent and that said Letters Patent is hereby corrected as shown below:

Column 1,
Line 10, delete "Modem" and insert -- Modern --.

Column 2,
Lines 41 and 46, delete "modem" and insert -- modern --.

Column 10,
Line 40, after "to" insert -- receiving --.

Signed and Sealed this

Twenty-seventh Day of May, 2003

JAMES E. ROGAN
*Director of the United States Patent and Trademark Office*